United States Patent
Idicula et al.

(10) Patent No.: US 7,424,495 B2
(45) Date of Patent: Sep. 9, 2008

(54) HANDLING UNIQUENESS CONSTRAINTS IN A DATABASE SYSTEM WITH VERSIONED DATA

(75) Inventors: Sam Idicula, San Jose, CA (US); Nipun Agarwal, Santa Clara, CA (US); Ravi Murthy, Fremont, CA (US); Thomas Baby, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 11/295,310

(22) Filed: Dec. 5, 2005

(65) Prior Publication Data

US 2007/0043783 A1 Feb. 22, 2007

Related U.S. Application Data

(60) Provisional application No. 60/709,550, filed on Aug. 19, 2005.

(51) Int. Cl.
*G06F 17/30* (2006.01)
(52) U.S. Cl. .................. 707/203; 707/204
(58) Field of Classification Search .......... 707/203–204
See application file for complete search history.

(56) References Cited

U.S. PATENT DOCUMENTS

| | | | |
|---|---|---|---|
| 5,535,386 A * | 7/1996 | Wang | 707/203 |
| 7,028,057 B1 * | 4/2006 | Vasudevan et al. | 707/203 |
| 7,099,899 B2 * | 8/2006 | Choy et al. | 707/203 |
| 7,143,123 B2 * | 11/2006 | Tom et al. | 707/204 |

* cited by examiner

*Primary Examiner*—Yicun Wu
(74) *Attorney, Agent, or Firm*—Hickman Palermo Truong & Becker LLP; Christian A. Nicholes

(57) ABSTRACT

A version history of each of a plurality of resources is stored in a table. The version history for each resource comprises a set of one or more values for the resource, wherein each value in the version history of a resource indicates the value that the resource had in a particular version of the resource. In response to a request to perform an operation that causes a given resource that is subject to a uniqueness constraint to have a particular value, it is determined whether the uniqueness constraint is violated based on whether any version of any resource other than the given resource has the particular value. The uniqueness constraint is determined to be violated if any version of any resource other than the given resource has the particular value. The uniqueness constraint is not violated by existence of a version of the given resource that has the particular value.

16 Claims, 5 Drawing Sheets

100

| ROWID | EMP. ID | ADDRESS | - | NAME | VERSION | VHID |
|---|---|---|---|---|---|---|
| 875 | 756 | 1142 MAPLE ST | ... | SMITH | V1 | 0 |
| 876 | 758 | 105 MAIN ST | ... | JONES | V1 | 1 |
| 877 | 821 | 258 OAK AVE | ... | MATTHEWS | V1 | 2 |
| 1101 | 756 | 705 WATER ST | ... | SMITH | V2 | 0 |
| 1102 | 758 | 1142 MAPLE ST | ... | JONES | V2 | 1 |
| 2158 | 400254 | 705 WATER ST | ... | SMITH | V3 | 0 |
| 2169 | 400255 | 1142 MAIN ST | ... | JONES | V3 | 1 |
| 2198 | 400259 | 258 OAK AVE | ... | MATHEWS | V2 | 2 |

| ROWID | U.C. COLUMN | VHID |
|---|---|---|
| 875 | 756 | 0 |
| 876 | 758 | 1 |
| 877 | 821 | 2 |
| 1101 | 756 | 0 |
| 1102 | 758 | 1 |
| 2158 | 400254 | 0 |
| 2169 | 400255 | 1 |
| 2198 | 400259 | 2 |

HANDLING UNIQUENESS CONSTRAINTS IN A DATABASE SYSTEM WITH VERSIONED DATA

PRIORITY INFORMATION

This application claims benefit of priority to Provisional U.S. Patent Application 60/709,550, entitled "Handling Uniqueness Constraint in a Database System with Versioned Data," filed Aug. 19, 2005, the aforementioned priority application being hereby incorporated by reference for all purposes.

FIELD OF THE INVENTION

The present invention relates to computer systems, and in particular, to enforcing uniqueness constraints in a database system with different versions of a resource.

BACKGROUND OF THE INVENTION

The approaches described in this section could be pursued, but are not necessarily approaches that have been previously conceived or pursued. Therefore, unless otherwise indicated herein, the approaches described in this section are not necessarily prior art to the claims in this application and are not admitted to be prior art by inclusion in this section.

In relational database management systems, information is stored in tables where each data item is stored at a particular row and column. In general, all of the information in a given row is associated with a particular object, and all of the information in a given column relates to a particular category of information. For example, each row of a table may correspond to a particular employee, and the various columns of the table may correspond to employee names, employee social security numbers, and employee salaries.

An application retrieves information from and updates a database by submitting queries to a database management system (DBMS). The DBMS processes the queries by retrieving the information and performing the updates specified in the queries. A series of queries or statements submitted to the DBMS for sequential execution is referred to as a transaction.

A database is a "versioned database" if it stores multiple versions of a given resource. For example, a versioned database may store multiple versions of a document. Most documents in the real world change over time. It is becoming increasingly important to keep a record of these changes, as this allows accessing an older version, determining who made each change, and tracking the progression of changes to the document. Thus, a versioned database not only provides a way to access document contents at important checkpoints but also allows users to track changes to a document.

Certain values within a document do not change from version to version. For example, an employee's ID typically does not change from year to year, but the employee record may need to be updated annually. Since each version of the employee record may need to be indexed and accessed as a separate entity, each version of the employee record is stored in a separate row of the table. However, this may lead to a uniqueness constraint problem when the value that is unchanged belongs to a constrained column.

A conventional uniqueness constraint prohibits two or more rows of a table from having the same value in a constrained column or group of columns. A database system will typically raise a uniqueness constraint violation if an application accessing the database attempts to perform an operation that causes two rows in a column under a uniqueness constraint to have the same value.

Some systems handle uniqueness constraint problems by storing older versions in a separate table (or other physical structure), hence ensuring that only one row in each version history is present in the table that has the constrained column. But this is based on the assumption that only one view (or label) of the table, typically the one showing the latest version, is needed. However, this assumption is not correct in many use cases.

Other systems may allow different versions to exist in the same table, and ensure that the uniqueness constraint is not violated in each registered view. However, using registered views is very expensive and inefficient.

Hence, there is a need to efficiently support uniqueness constraints when multiple versions of a resource are stored as different rows of a table. Note that, although this problem has been explained in the context of documents, it is equally applicable to relational rows that are versioned in a similar way.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a secondary table that is used to efficiently enforce a uniqueness constraint, in accordance with an embodiment of the present invention;

DETAILED DESCRIPTION OF THE INVENTION

A method and apparatus for handling uniqueness constraints in a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Versioning Overview

A versioning system allows users to put a resource under version control, create and access distinct versions of the resource, and track the progression of changes to the resource.

A "version" of a resource is a copy of the resource that reflects a particular state. "Version control" is a set of constraints on how the resource can be updated. When a resource is put under version control, it becomes a "version-controlled resource." A resource under a uniqueness constraint is referred to herein as a "constrained resource."

A version controlled resource may be checked-in or checked-out. A version may be created by "checking in" a checked-out resource. A version-controlled resource can be "checked out" to allow modification of its content.

As used herein, the term "version history" or "version history of a resource" means all of the versions of a resource. Thus, a version history for each resource comprises a set of one or more values for the resource.

A "versioned database" can be configured to respond to an update of a resource within the database by establishing the new value introduced by the update as a new version of the resource and continuing to maintain the previous value as a previous version of the resource to allow the previous value to continue to be accessed as the previous version of the resource.

Overview

A method and apparatus for handling uniqueness constraints is provided. In accordance with one embodiment, a version history of each of a plurality of resources is stored in a table. The version history for each resource comprises a set of one or more values for the resource, wherein each value in the version history of a resource indicates the value that the resource had in a particular version of the resource. In response to a request to perform an operation that causes a given constrained resource to have a particular value, it is determined whether the uniqueness constraint is violated based on whether any version of any resource other than the given resource has the particular value. The uniqueness constraint is determined to be violated if any version of any resource other than the given resource has the particular value. The uniqueness constraint is not violated by existence of another version of the given resource that has the particular value.

Figures 1A, 1B:
FIG. 1A illustrates a table having versioned resources, for which an embodiment of the present invention enforces a uniqueness constraint.
FIG. 1B illustrates version history identifiers associated with version histories, in accordance with an embodiment of the present invention.

FIG. 1A illustrates a version-enabled table 100 having versioned resources, for which an embodiment of the present invention enforces a uniqueness constraint. The version-enabled table 100 contains a row, which is uniquely identified by the RowID column 102, for each version of each employee's record. For example, rows with RowIDs 875, 1101, and 2158 contain three different versions of Smith's employee record, as indicated in the version column 110. The version-enabled table 100 has a uniqueness-constrained column 104, which contains employee IDs. Different versions of a given employee's ID can have the same value in different rows without violating the uniqueness constraint because different versions of a given resource are allowed to have the same value. For example, Smith's employee ID is 756 in the rows with RowIDs 875 and 1101. However, no value of any version of a given resource is allowed in any version of another resource. For example, no value of any version of Smith's employee ID is allowed in any version of any other employee's ID.

Thus, the version-enabled table 100 contains multiple versions of a resource that is subject to a uniqueness constraint ("constrained resource"), in accordance with an embodiment of the present invention. The record for each employee may have resources that are not subject to a uniqueness constraint. For example, the employees' addresses in column 106 and names in column 108 are not subject to a uniqueness constraint.

Table 100 contains a VHID column 112 for a version history identifier (VHID). A unique VHID is assigned to each version history in the uniqueness constrained (UC) column 104. For example, all of the values of the version history for the resource of Smith's employee ID are assigned a VHID of "0". It is possible that different values in the uniqueness constrained column 104 map to the same VHID. For example, Smith's employee ID of 758 and 400254 both are associated with VHID of "0". However, a given value in the UC column 104 should not be associated with more than one VHID. For example, all versions of Smith's employee ID that are 756 all are associated with VHID=0, and should not be associated with any other VHID. This mapping is done by ensuring that, for each row involved in an INSERT or UPDATE operation, the value in the column is not being used by another version history.

FIG. 1B illustrates VHIDs associated with the version histories of the employee ID resource from version-enabled table 100, in accordance with an embodiment of the present invention. A version history for each resource comprises a set of one or more values for the resource. For example, the version history of the employee ID resource for Smith comprises the values 756, 756, and 400254. Each value in the version history of a resource indicates that value that the resource had in a particular version of the resource.

The values of the resources in the version histories are set-wise unique. Set-wise uniqueness means that the sets for different version histories should be disjoint. For example, if an employee Jones has the employee ID 758 and 40255 in different versions of Jones's employee record, then no version of any other employee's record can use either of these values. However, any version of Jones's employee record can have these values, even if they are duplicated in different versions. Note that if set-wise uniqueness is enforced, then uniqueness in every SQL operation is guaranteed, since each operation sees only one version of each version history.

The constrained resource can be associated with documents that are structured in a variety of ways. For example, the content of documents stored in a database system can have varying degrees of structure, from highly structured XML documents (like Purchase Orders) to completely unstructured ones (like text or image files). Even in the case of unstructured content, there may be structured metadata associated with the document. The structured parts of a document are typically stored in data version-enabled tables. It is often necessary to define uniqueness constraints on some of these attributes. For example, the reference number of a Purchase Order and the employee ID of an employee should be unique. However, the uniqueness constraints can apply to other resources stored in a database.

Functional Overview

Figure 2:
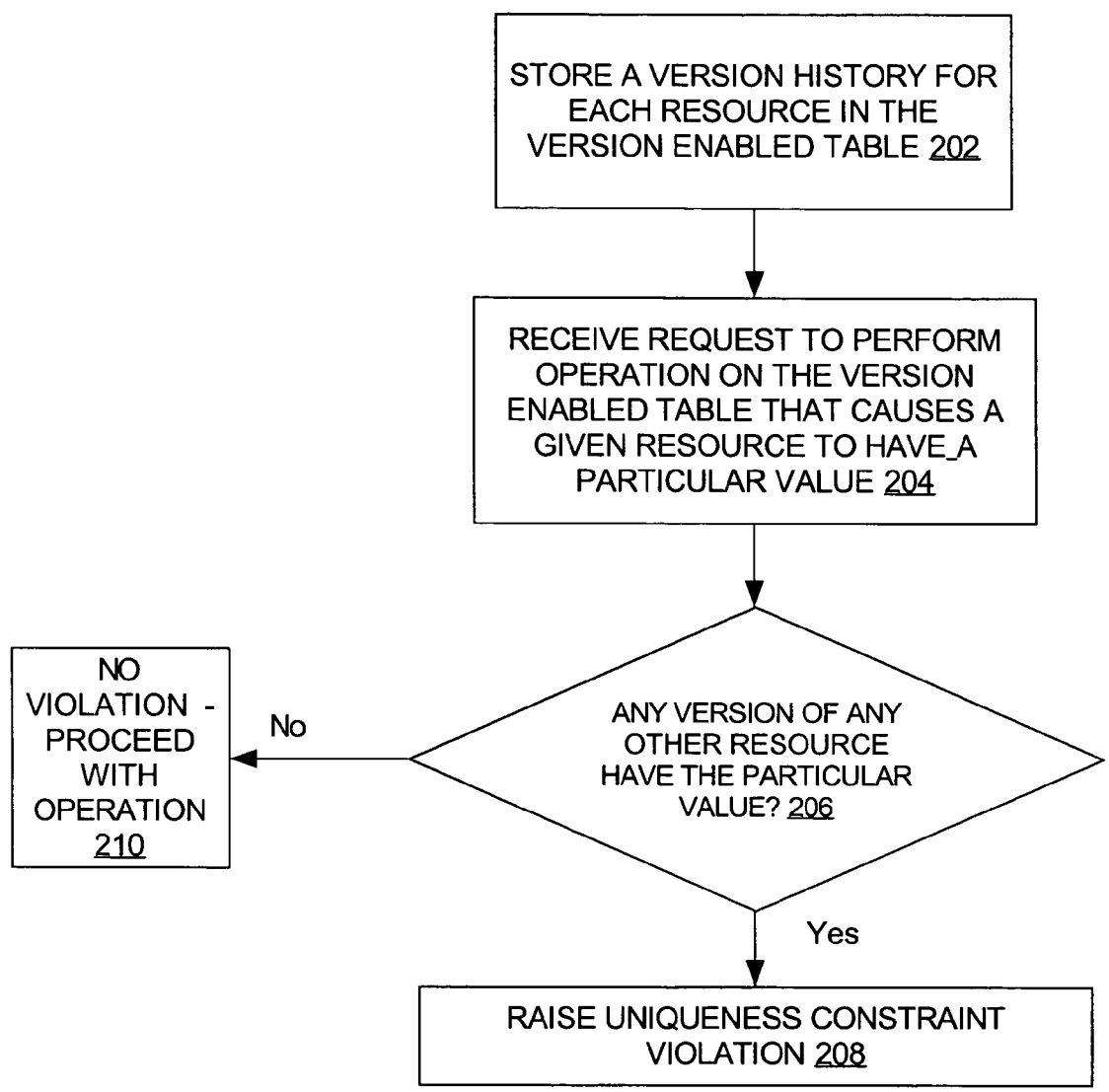
FIG. 2 is a flowchart illustrating steps of a process of handling uniqueness constraints, in accordance with an embodiment of the present invention.

FIG. 2 is a flowchart illustrating steps of a process of handling uniqueness constraints, in accordance with an embodiment of the present invention. In step 202, a version history of each of a plurality of resources is stored in a table. The step may involve many database operations. The version history for each resource comprises a set of one or more values for the resource, wherein each value in the version history of a resource indicates the value that the resource had in a particular version of the resource. For example, the resource may be a given employee's ID, wherein the different versions may or may not be the same value.

The database is a versioned database in that it is configured to respond to an update of a data item within the database by establishing the new value introduced by the update as a new version of the data item and continuing to maintain the previous value as a previous version of the data item to allow the previous value to continue to be accessed as the previous version of the data item.

In step 204, a request is received to perform an operation that causes a given resource that is subject to a uniqueness constraint to have a particular value. For example, the operation will cause a version of Smith's employee ID to have a value "x". The request to perform an operation may be a request to insert a row that specifies the particular value for the given resource. The request to perform an operation may be a request to perform an update that will cause an existing row that contains the resource to have the particular value for the resource.

In step 206, in response to the request to perform the operation, it is determined whether the uniqueness constraint is violated based on whether any version of any resource other than the given resource has the particular value. For example, a check is made to determine if the value "x" exists in any version of any employee ID other than Smith's.

If it is determined that the operation will cause a uniqueness constraint violation, control passes to step 208, where a uniqueness constraint is raised.

If it is determined that the operation will not cause a uniqueness constraint violation, control passes to step 210, wherein the operation is allowed to be performed. Note, that the uniqueness constraint is not violated by existence of another version of the resource that has the particular value. For example, different versions of Smiths' employee ID can have the same value without violating a set-wise uniqueness constraint, in accordance with an embodiment of the present invention.

Secondary Structure

In order to facilitate enforcing set-wise uniqueness constraints, one or more secondary structures are provided, in accordance with an embodiment of the present invention. FIG. 3 is a secondary table 300 that is used to efficiently enforce a uniqueness constraint, in accordance with an embodiment of the present invention. Secondary table 300 can be derived from the version-enabled table 100 and contains the RowID column 102, the uniqueness constrained (UC) column 104, and the VHID column 112. FIG. 4A and FIG. 4B describe how the secondary table 300 is used to enforce a set-wise uniqueness constraint. In one implementation the secondary table 300 is a domain index.

Enforcing a Uniqueness Constraint in Accordance with One Embodiment

Figure 4:
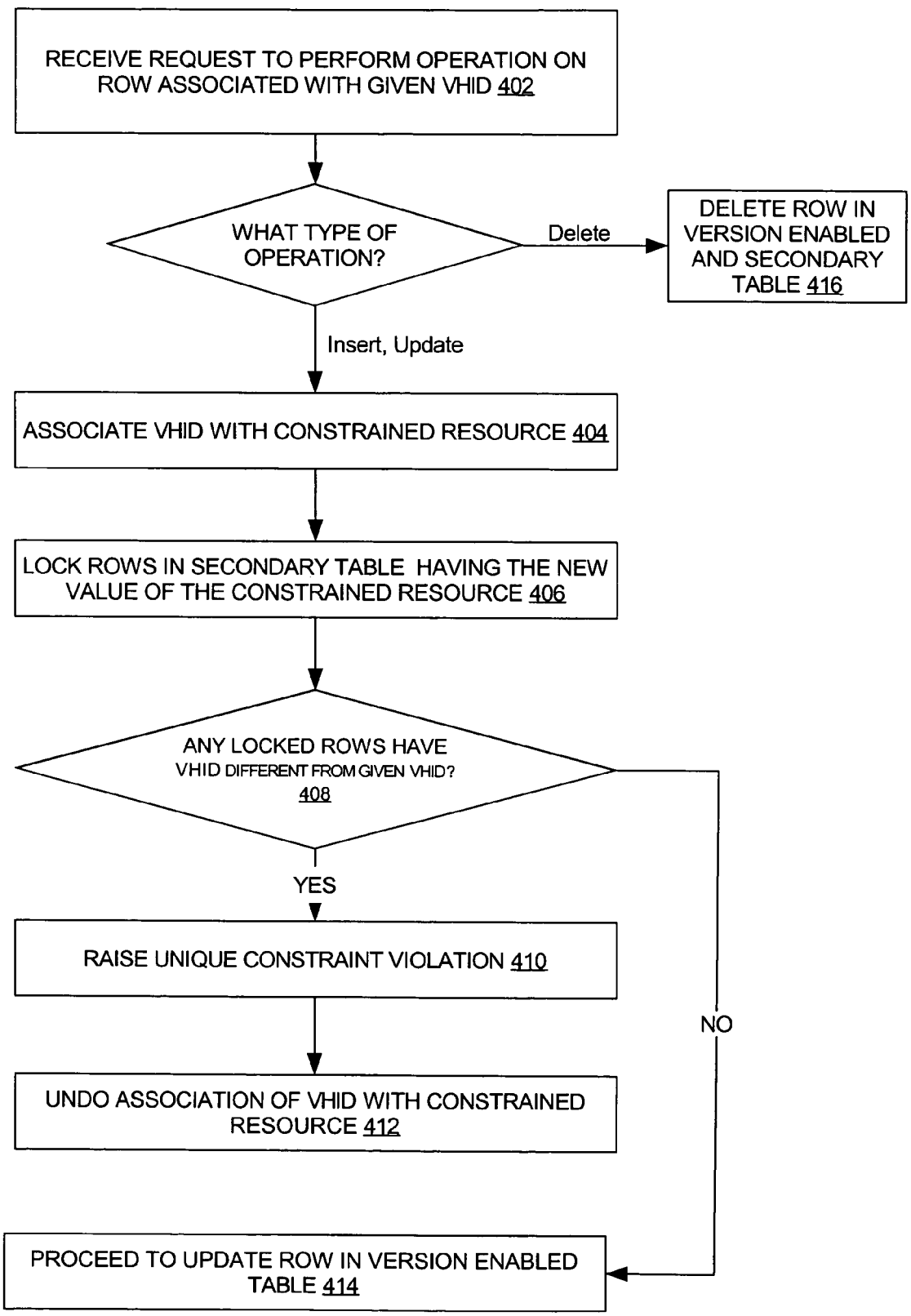
FIG. 4 is a flowchart illustrating a process of enforcing a uniqueness constraint for a row operation, in accordance with an embodiment of the present invention.

FIG. 4 is a flowchart illustrating a process of enforcing a uniqueness constraint for a row operation for version-enabled table 100, in accordance with an embodiment of the present invention. The process also involves updating the secondary table 300 when an operation (e.g., DML statement) is performed on the version-enabled table 100. In step 402, a request is received to perform an operation on the version-enabled table 100.

If the operation is a row insert or update, control passes to step 404. If executed on the version-enabled table 100, the operation will cause a row having a particular RowID to have a particular value in the uniqueness constrained column 104. In step 404, a VHID is associated with the constrained resource. The VHID will be the same VHID associated with other versions of the constrained resource, if any.

Step 404 may comprise inserting into the secondary table 300 a new row having the particular RowID, the particular value, and the VHID. Step 406 may comprise updating a row in secondary table 300 that has the particular RowID by changing the value in the uniqueness constrained column of the secondary table 300 to the particular value, while leaving the VHID value in the VHID column 306 unchanged.

In step 406, all rows in the secondary table 300 that have the particular value of the constrained resource are locked. In step 408, it is determined whether any of the locked rows have a VHID value other than that of the row with the particular RowID. If so, control passes to step 410, wherein a constraint violation error is raised. Furthermore, the association of the VHID with the particular resource is undone. For example, the row update or row insertion of step 404 is undone.

If all of the locked rows have the same VHID as the VHID associated with the constrained resource, there is not a uniqueness constraint violation. Therefore, control passes to step 412, wherein the operation received in step 402 is allowed to proceed on the version-enabled table 100.

If the operation received in step 402 is to delete a row in the version-enabled table 100, then control passes to step 416. In step 416, the corresponding row in the secondary table 300 is deleted. For example, if an operation is received to delete version 2 of Smith's employee record in version-enabled table 100, then the rows with RowIDs 1101 are deleted in both the secondary table 300 and the version-enabled table 100. It is not necessary to perform uniqueness constraint checks for this case. Further, the delete operation is allowed to proceed on the version-enabled table 100.

Concurrency

In order to prevent currency issues from causing a failure to detect a uniqueness violation, the checks for a uniqueness violation should be for all current transactions, whether they are committed or not. For example, consider the case of two concurrent transactions inserting rows in the version enabled table 100 with the same employee ID, but for different employees. This should cause a uniqueness constraint violation for at least one of the transactions. However, were a check for a uniqueness constraint to be performed for each of the two transactions without the knowledge of the other transaction, neither check would detect a uniqueness constraint violation. Therefore, the check for a uniqueness constraint violation should include all current sets of rows, whether the transaction is committed or not.

Implementation Details—Hardware Overview

Figure 5:
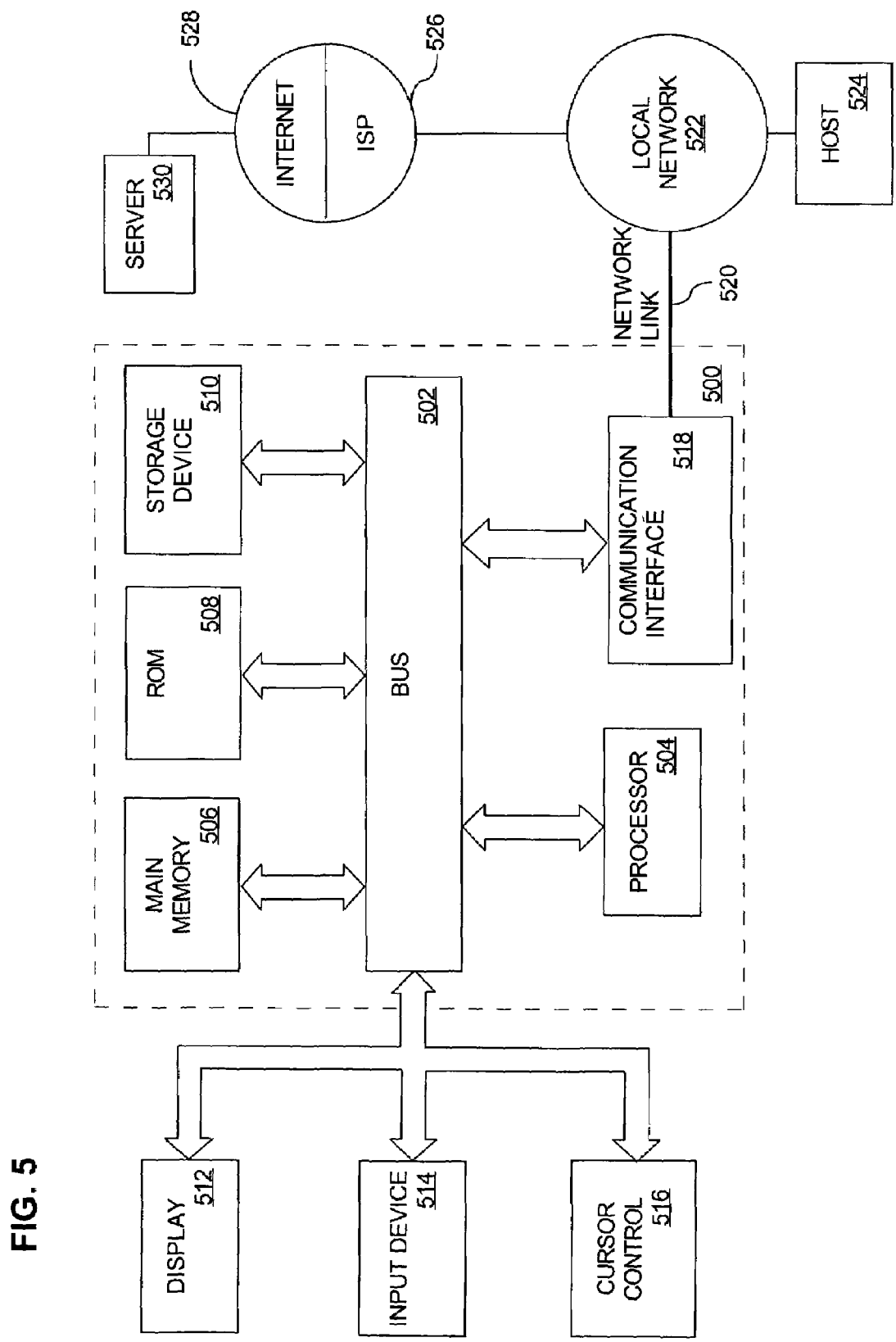
FIG. 5 is a block diagram that illustrates a computer system upon which an embodiment may be implemented.

FIG. 5 is a block diagram that illustrates a general-purpose computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 505. Main memory 506 also may be used for storing temporary variables or other intermediate information during execution of instructions to be executed by processor 505. Computer system 500 further includes a read only memory ("ROM") 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 515, including alphanumeric and other keys, is coupled to bus 502 for communicating information and command selections to processor 505. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for re-authenticating computing devices. According to one embodiment of the invention, re-authenticating computing devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 505.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for re-authenticating computing devices as described herein.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of handling uniqueness constraints, said method comprising the computer-implemented steps of:

storing a version history of each of a plurality of resources in a table, wherein the version history for each resource comprises a set of one or more values for said resource, wherein each value in the version history of a resource indicates the value that the resource had in a particular version of the resource; and in response to a request to perform an operation that causes a given resource that is subject to a uniqueness constraint to have a particular value, determining whether the uniqueness constraint is violated based on whether any version of any resource in said table other than said given resource has said particular value;

wherein the uniqueness constraint is determined to be violated if any version of any resource in said table other than said given resource has said particular value; and wherein said uniqueness constraint is not violated by existence of a version of said given resource in said table that has said particular value;

wherein, after performance of said operation, said table comprises multiple occurrences of a particular value in a column that is subject to said uniqueness constraint.

2. The method as recited in claim 1, wherein said request to perform an operation is a request to insert a row that specifies said particular value for said given resource.

3. The method as recited in claim 1, wherein said request to perform an operation is a request to perform an update that causes an existing row that contains said given resource to have said particular value for said given resource.

4. The method as recited in claim 1, wherein the database is configured to respond to an update of a data item within the database by establishing the new value introduced by the update as a new version of the data item and continuing to maintain the previous value as a previous version of the data item to allow the previous value to continue to be accessed as the previous version of the data item.

5. The method as recited in claim 1, further comprising associating a unique version history identifier to the version history of each of the plurality of resources, wherein each row of said table has associated with one of the version history identifiers.

6. The method as recited in claim 5, wherein the step of determining whether the uniqueness constraint is violated comprises:

determining if said particular value is included in a row in said table that is associated with a version history identifier other than the version history identifier associated with said given resource;

wherein the uniqueness constraint is determined to be violated if said particular value is included in a row associated with another version history identifier; and wherein said uniqueness constraint is not violated if said particular value is included in a row associated with said version history identifier.

7. A method as recited in claim 1, further comprising:

maintaining a secondary table comprising the plurality of resources and unique version history identifiers, wherein the set of one or more values for each resource is associated with one of said unique version history identifiers, and wherein said secondary table is used for determining whether the uniqueness constraint is violated.

8. A method as recited in claim 1, wherein said determining whether the uniqueness constraint is violated comprises performing a check of current transactions that are committed and current transactions that have not yet been committed.

9. A volatile or non-volatile computer-readable medium carrying one or more sequences of instructions which, when executed by one or more processors, causes the one or more processors to perform the method recited in claim 1.

10. A volatile or non-volatile A computer-readable medium carrying one or more sequences of instructions which, when executed by one or more processors, causes the one or more processors to perform the method recited in claim 2.

11. A volatile or non-volatile computer-readable medium carrying one or more sequences of instructions which, when executed by one or more processors, causes the one or more processors to perform the method recited in claim 3.

12. A volatile or non-volatile computer-readable medium carrying one or more sequences of instructions which, when executed by one or more processors, causes the one or more processors to perform the method recited in claim 4.

13. A volatile or non-volatile computer-readable medium carrying one or more sequences of instructions which, when executed by one or more processors, causes the one or more processors to perform the method recited in claim 5.

14. A volatile or non-volatile computer-readable medium carrying one or more sequences of instructions which, when executed by one or more processors, causes the one or more processors to perform the method recited in claim 6.

15. A volatile or non-volatile computer-readable medium carrying one or more sequences of instructions which, when executed by one or more processors, causes the one or more processors to perform the method recited in claim 7.

16. A volatile or non-volatile computer-readable medium carrying one or more sequences of instructions which, when executed by one or more processors, causes the one or more processors to perform the method recited in claim 8.

* * * * *

UNITED STATES PATENT AND TRADEMARK OFFICE
CERTIFICATE OF CORRECTION

PATENT NO. : 7,424,495 B2 Page 1 of 1
APPLICATION NO. : 11/295310
DATED : September 9, 2008
INVENTOR(S) : Idicula et al.

It is certified that error appears in the above-identified patent and that said Letters Patent is hereby corrected as shown below:

In column 10, line 14, in claim 10, after "non-voilate" delete "A".

Signed and Sealed this

Sixteenth Day of March, 2010

David J. Kappos
*Director of the United States Patent and Trademark Office*